United States Patent
Richter

(10) Patent No.: US 12,136,264 B2
(45) Date of Patent: Nov. 5, 2024

(54) OBFUSCATING LOCATION DATA ASSOCIATED WITH A PHYSICAL ENVIRONMENT

(71) Applicant: Apple Inc., Cupertino, CA (US)

(72) Inventor: Ian M. Richter, Los Angeles, CA (US)

(73) Assignee: APPLE INC., Cupertino, CA (US)

( * ) Notice: Subject to any disclaimer, the term of this patent is extended or adjusted under 35 U.S.C. 154(b) by 385 days.

(21) Appl. No.: 17/462,867

(22) Filed: Aug. 31, 2021

(65) Prior Publication Data
US 2021/0397811 A1 Dec. 23, 2021

Related U.S. Application Data

(63) Continuation of application No. PCT/US2020/034481, filed on May 26, 2020.
(Continued)

(51) Int. Cl.
*G06V 20/00* (2022.01)
*G06F 21/62* (2013.01)
(Continued)

(52) U.S. Cl.
CPC .......... *G06V 20/13* (2022.01); *G06F 21/6245* (2013.01); *G06T 5/50* (2013.01);
(Continued)

(58) Field of Classification Search
CPC .... G06V 20/13; G06V 20/52; G06F 21/6245; G06T 5/50; G06T 7/11; G06T 7/50; G06T 2207/10016; G06T 2207/10024; G06T 2207/30232; H04N 21/41407; H04N 21/42202; H04N 21/4223;
(Continued)

(56) References Cited

U.S. PATENT DOCUMENTS 8,311,275 B1 * 11/2012 Berlic .................... H04N 7/183
348/169
8,600,102 B1 * 12/2013 Frome .................. G06V 40/172
382/181
(Continued)

FOREIGN PATENT DOCUMENTS

WO 2010036098 A1 4/2010
WO 2018071190 A1 4/2018
WO 2018125762 A1 7/2018

OTHER PUBLICATIONS

Author: Ademic; Title: "The Pros and Cons of Color Processing with Machine Vision Cameras"; Date: Jun. 8, 2011 (Year: 2011).*
(Continued)

*Primary Examiner* — Aaron W Carter
(74) *Attorney, Agent, or Firm* — Fernando & Partners, LLP

(57) ABSTRACT

Various implementations disclosed herein include devices, systems, and methods for obfuscating location data associated with a physical environment. In some implementations, a method includes obtaining, via an environmental sensor, environmental data corresponding to a physical environment. A first portion of the environmental data that corresponds to a first location is identified. In response to the first location being of a first location type, location data indicative of the first location is obfuscated from the environmental data by modifying the first portion of the environmental data.

20 Claims, 10 Drawing Sheets

Related U.S. Application Data

(60) Provisional application No. 62/853,860, filed on May 29, 2019.

(51) Int. Cl.
*G06T 5/50* (2006.01)
*G06T 7/11* (2017.01)
*G06T 7/50* (2017.01)
*G06V 20/13* (2022.01)
*G06V 20/52* (2022.01)

(52) U.S. Cl.
CPC ............... *G06T 7/11* (2017.01); *G06T 7/50* (2017.01); *G06V 20/52* (2022.01); *G06T 2207/10016* (2013.01); *G06T 2207/10024* (2013.01); *G06T 2207/30232* (2013.01)

(58) Field of Classification Search
CPC ..... H04N 21/44008; H04N 21/440245; H04N 21/4524; H04N 21/4542; H04N 21/45455; H04N 21/4627; H04N 21/4788; H04N 21/8146; H04N 21/816
See application file for complete search history.

(56) References Cited

U.S. PATENT DOCUMENTS

| | | | | |
|---|---|---|---|---|
| 9,467,664 | B2* | 10/2016 | Blanco | G05B 19/048 |
| 10,956,726 | B1* | 3/2021 | Quark | G06T 19/006 |
| 11,450,104 | B1* | 9/2022 | Mittal | G06V 10/26 |
| 2008/0297586 | A1 | 12/2008 | Kurtz et al. | |
| 2010/0246890 | A1* | 9/2010 | Ofek | G06V 20/63 |
| | | | | 382/105 |
| 2010/0296705 | A1 | 11/2010 | Miksa et al. | |
| 2012/0131471 | A1 | 5/2012 | Terlouw et al. | |
| 2015/0085163 | A1* | 3/2015 | Aimi | H04N 5/2621 |
| | | | | 348/234 |
| 2015/0106627 | A1 | 4/2015 | Holman et al. | |
| 2015/0145992 | A1* | 5/2015 | Traff | G06V 20/00 |
| | | | | 348/143 |
| 2015/0172449 | A1* | 6/2015 | Clavenna, II | H04M 1/72463 |
| | | | | 455/418 |
| 2016/0150188 | A1* | 5/2016 | Ha | H04N 23/69 |
| | | | | 348/143 |
| 2016/0314306 | A1* | 10/2016 | Takahashi | G06V 20/10 |
| 2016/0381064 | A1* | 12/2016 | Chan | H04L 63/1433 |
| | | | | 726/25 |
| 2017/0085834 | A1 | 3/2017 | Kim et al. | |
| 2017/0287226 | A1 | 10/2017 | Du | |
| 2017/0289623 | A1 | 10/2017 | Bailey et al. | |
| 2018/0324436 | A1* | 11/2018 | Danielsson Fan | H04N 19/61 |
| 2018/0330591 | A1 | 11/2018 | Tilkin et al. | |
| 2019/0068895 | A1* | 2/2019 | Hutz | G06F 18/24143 |
| 2019/0188830 | A1* | 6/2019 | Edwards | G06N 3/047 |
| 2019/0340731 | A1* | 11/2019 | Nyström | G06T 5/20 |
| 2019/0377901 | A1* | 12/2019 | Balzer | G06F 21/6254 |
| 2020/0184608 | A1* | 6/2020 | Greasley | G06T 11/001 |
| 2020/0243115 | A1* | 7/2020 | Witt | G06F 21/6245 |
| 2020/0250401 | A1* | 8/2020 | Kaneishi | G06T 5/70 |
| 2021/0051294 | A1* | 2/2021 | Roedel | G06F 21/6245 |
| 2021/0243149 | A1* | 8/2021 | Schneider | H04L 51/222 |
| 2021/0385412 | A1* | 12/2021 | Matula | H04N 7/15 |
| 2021/0397811 | A1* | 12/2021 | Richter | H04N 21/4627 |
| 2022/0012366 | A1* | 1/2022 | Burceanu | H04L 9/008 |
| 2022/0188989 | A1* | 6/2022 | Greasley | G06F 21/6254 |
| 2022/0201253 | A1* | 6/2022 | Lundberg | H04N 7/188 |
| 2022/0207869 | A1* | 6/2022 | Goodrich | G06V 10/82 |
| 2022/0286438 | A1* | 9/2022 | Burke, Jr. | H04L 63/1416 |
| 2022/0377277 | A1* | 11/2022 | Guzik | H04N 5/91 |
| 2023/0021423 | A1* | 1/2023 | DeVico | G06F 21/577 |
| 2023/0237192 | A1* | 7/2023 | Kahan | G06F 21/6245 |
| | | | | 726/1 |
| 2023/0345100 | A1* | 10/2023 | Reading | H04N 23/55 |

OTHER PUBLICATIONS

Office Action for corresponding Chinese Application No. 2020800394350 dated Jul. 27, 2023.
PCT International Search Report and Written Opinion dated Jul. 14, 2020, International Application No. PCT/US2020/034481, pp. 1-10.
Ido Omer et al., "Identifying Plane Outliers In Scenes Using Re-Projection For Privacy Protection," The IP.com Journal, http://www.ip.com/pubview/IPCOM000183324D, May 2009, pp. 1-2 (Abstract Submitted).
Office Action for corresponding Chinese Application No. 2020800394350 dated Jan. 20, 2024.

* cited by examiner

400

Obtain environmental data corresponding to physical environment

- Environmental data includes image and/or mesh map 410a
- Capture image data frame 410b
- Capture video feed including image data frame 410c
- Receive image frame from other device 410d
- Image data frame corresponds to physical environment 410e
- Image data frame corresponds to environment 410f

⎯410

Identify first portion of environmental data corresponding to first location

- Generate pixel characterization vector for each pixel 420a
- Pixel characterization vector includes object label and/or location label 420b
- Object label identifies object 420c
- Location label includes GPS info., intra-building location info., and/or location type 420d
- Pixel labeler and/or machine learning segmentation system generates pixel characterization vectors 420e

```
                    Continued from FIG. 4A
```

Obfuscate location data indicative of first location from environmental data in response to first location being of a first location type Modify pixel data for plurality of pixels 430a Pixel data includes RGB data 430b ⟵ 430

Modify pixel data based on security classification of first location and/or permission level associated with user type 430c Security type is secure or nonsecure 430d Permission type is supervisor, colleague, subordinate, trusted external colleague, nontrusted external colleague, customer, family, friend, and/or general public 430e Replace pixels indicative of first location of first location type with replacement pixels indicative of second location of second location type 430f Generate first modified image data frame 430g Provide first modified image data frame to rendering and display pipeline 430h Transmit first modified image data frame to another device 430i Display first modified image data frame 430j

FIG. 4B

OBFUSCATING LOCATION DATA ASSOCIATED WITH A PHYSICAL ENVIRONMENT

CROSS-REFERENCE TO RELATED APPLICATION

This application is a continuation of Intl. Patent App. No. PCT/US2020/34481, filed on May 26, 2020, which claims priority to U.S. Provisional Patent App. No. 62/853,860, filed on May 29, 2019, which are both hereby incorporated by reference in their entirety.

TECHNICAL FIELD

The present disclosure generally relates to obfuscating location data associated with a physical environment.

BACKGROUND

Some devices are capable of providing environmental data, such as images, to other devices. For example, some devices include a camera that captures a video feed that is transmitted to other devices. Users of some devices transmit video captured by their devices to other devices during video calls. Being able to transmit and/or receive video data provides a better user experience than just transmitting or receiving voice data. However, some users decide not to transmit video in order to avoid the risk of transmitting certain (e.g., undesirable) information.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 4A and 4B are flowchart representations of a method of synthesizing a modified image data frame in accordance with some implementations.

Figure 1:
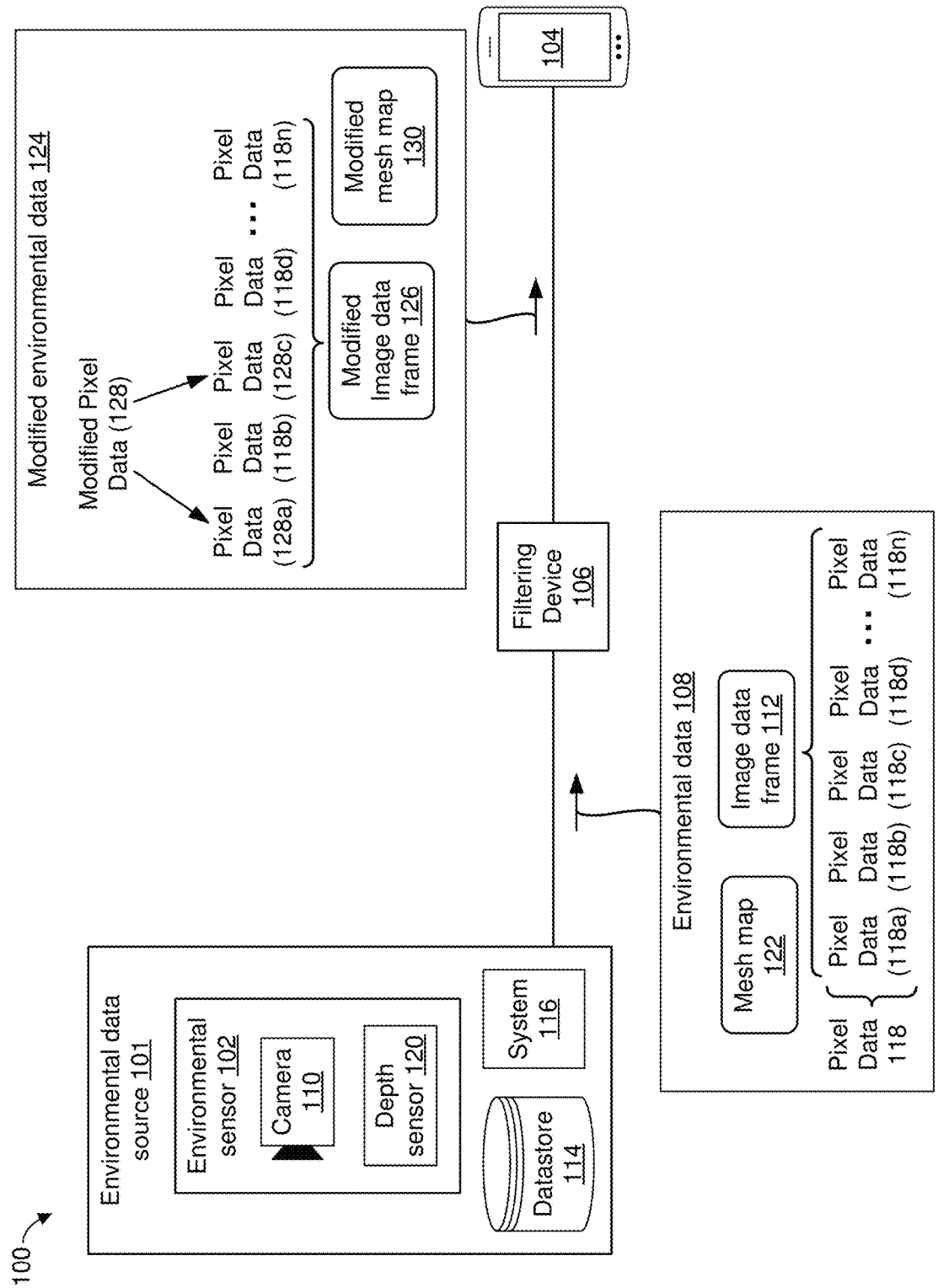
FIG. 1 illustrates an exemplary operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for obfuscating location data that is associated with a physical environment. In various implementations, a device includes an environmental sensor, a non-transitory memory, and one or more processors coupled with the non-transitory memory. In some implementations, a method includes obtaining, via the environmental sensor, environmental data corresponding to a physical environment. In some implementations, the method includes identifying a first portion of the environmental data that corresponds to a first location. In response to the first location being of a first location type, obfuscating, from the environmental data, location data indicative of the first location by modifying the first portion of the environmental data.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment.

In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, ahead mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some implementations, a device provides environmental data, such as images, to another device. For example, in some implementations, a device includes a camera that captures a video feed that is transmitted to other devices. A user can transmit video captured by the device to another device during a video call. The ability to transmit and/or receive video data provides a better user experience than just transmitting or receiving voice data. However, some users may avoid transmitting video to reduce the risk of transmitting certain, e.g., undesirable information. For example, users that are located in sensitive areas, such as home offices, may decide not to transmit video during video calls in order to reduce the risk of inadvertently disclosing their location.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

Various implementations disclosed herein consider the option of storing a user's personal information. For example, images of personal locations may be stored in order to facilitate modifying environmental data to reduce the transmission of location data to a user of a client device. However, to the extent such personal information is stored, such information is stored with the user's informed consent. As described herein, the user is provided knowledge of and provided control over the storage of their personal information.

The present disclosure provides methods, systems, and/or devices for filtering an image data frame in order to obfuscate location data represented by one or more pixels in the image data frame. In various implementations, filtering the image data frame includes identifying pixels that indicate the location data, and changing the values of the pixels that indicate the location data. In some implementations, obfuscating the location data includes blurring the pixels that correspond to the location data. In some implementations, obfuscating the location data includes setting the value of the pixels to a particular color (e.g., black, white, etc.). In some implementations, obfuscating the location data includes replacing the location data with replacement location data.

FIG. 1 illustrates an exemplary operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes an environmental data source 101 (e.g., an environmental sensor 102), a client device 104, and a filtering device 106. In the example of FIG. 1, the filtering device 106 is shown as being separate from the environmental sensor 102 and the client device 104. However, in some implementations, the filtering device 106 and the environmental sensor 102 are integrated into a single device. Alternatively, in some implementations, the filtering device 106 is integrated into the client device 104. In some implementations, the filtering device 106 resides at (e.g., is integrated into) a server (e.g., an enterprise server that is controlled by an enterprise).

In various implementations, the environmental sensor 102 provides environmental data 108 to the filtering device 106. In some implementations, the environmental sensor 102 includes a camera 110 that captures an image data frame 112. In some implementations, the camera 110 is integrated into another device, such as a mobile computing device (e.g., a smartphone or a tablet). In some implementations, the environmental data source 101 includes a datastore 114 which may store the image data frame 112. In some implementations, the environmental data source 101 includes an extended reality (XR) system 116 which generates an XR experience, of which the image data frame 112 may be a part. The datastore 114 and/or the XR system 116 may be integrated into the same device as the camera 110 or may be implemented in one or more other devices.

As shown in FIG. 1, the image data frame 112 includes pixel data 118 for various pixels in the image data frame 112. For example, the image data frame 112 includes first pixel data 118a for a first pixel, second pixel data 118b for a second pixel, third pixel data 118c for a third pixel, fourth pixel data 118d for a fourth pixel, and nth pixel data 118n for an nth pixel. In some implementations, the pixel data 118 includes pixel values. For example, the pixel data 118 includes red, green, and blue (RGB) color values for the corresponding pixels.

In some implementations, the environmental sensor 102 includes a depth sensor 120. The depth sensor 120 may use, for example, a laser and/or a camera array to calculate depth information for a subject or area. In some implementations, the depth information is stored, for example, in a mesh map 122, which may be included in the environmental data 108.

In various implementations, the filtering device 106 modifies the environmental data 108 in order to generate modified environmental data 124. In some implementations, the filtering device 106 modifies the image data frame 112 to generate a modified image data frame 126 in order to obfuscate location data (e.g., location data indicating a location of an object) from the image data frame 112. In some implementations, the filtering device 106 changes the values of some of the pixels, while leaving the values of other pixels unchanged. In the example of FIG. 1, the modified image data frame 126 includes modified pixel data 128 for some of the pixels. For example, the modified image data frame 126 includes modified pixel data 128a for the first pixel and modified pixel data 128c for the third pixel. As shown in FIG. 1, in some implementations, the modified image data frame 126 also includes unmodified pixel data for some pixels. For example, the modified image data frame 126 includes unmodified second pixel data 118b for the second pixel, unmodified fourth pixel data 118d for the fourth pixel, and unmodified pixel data 118n for the nth pixel.

In some implementations, the filtering device 106 modifies the mesh map 122 to generate a modified mesh map 130. The modified mesh map 130 may include depth information that is consistent with the modified image data frame 126. For example, in some implementations, if the filtering device 106 modifies the image data frame 112 to obfuscate location data from the image data frame 112, the filtering device 106 also modifies the mesh map 122 so as to mask the location data.

In various implementations, the client device 104 obtains the modified environmental data 124 including the modified pixel data 128 and the modified mesh map 130. The client device 104 may render the modified image data frame 126 on a display of the client device 104. Since the modified image data frame 126 includes modified pixel data 128, in some implementations, some of the pixels displayed at the client device 104 are obfuscated. For example, in some implementations, some of the pixels displayed at the client device 104 are blurred. In some implementations, some of the pixels displayed at the client device 104 are masked (e.g., blacked-out). In various implementations, the client device 104 includes a mobile computing device (e.g., a smartphone, a tablet, or a laptop), a desktop, a television, and/or an XR device (e.g., a head-mountable device such as an AR/VR headset).

In some implementations, a head-mountable device (HMD), being worn by a user, presents (e.g., displays) an extended reality (XR) environment according to various implementations. In some implementations, the HMD includes an integrated display (e.g., a built-in display) that displays the XR environment. In some implementations, the HMD includes a head-mountable enclosure. In various implementations, the head-mountable enclosure includes an attachment region to which another device with a display can be attached. For example, in some implementations, the client device 104 can be attached to the head-mountable enclosure. In various implementations, the head-mountable enclosure is shaped to form a receptacle for receiving another device that includes a display (e.g., the client device 104). For example, in some implementations, the client device 104 slides or snaps into or otherwise attaches to the head-mountable enclosure. In some implementations, the display of the device attached to the head-mountable enclosure presents (e.g., displays) the XR environment. In various implementations, examples of the client device 104 include smartphones, tablets, media players, laptops, etc.

In various implementations, the filtering device 106 allows the environmental sensor 102 to provide the environmental data 108 while preventing the client device 104 from viewing certain location data represented by the environmental data 108. As such, the filtering device 106 provides more control over what a user of the client device 104 is able to view. In various implementations, the filtering device 106 reduces the need to block transmittal of image data frames altogether because the filtering device 106 allows certain location data to be obfuscated, thereby enhancing user experience. In various implementations, the filtering device 106 thus enhances a user's privacy by obfuscating or otherwise limiting the transmission of certain location data from the user's environment to another, at the user's control.

It will be appreciated that, while the filtering device 106 can prevent the client device 104 from viewing certain location data and may reduce the amount of location data that is transmitted to the client device 104, the filtering device 106 may not completely eliminate transmission of location data to the client device 104. For example, a user of the client device 104 may be able to determine (e.g., infer) location data from contextual information in the environmental data 108.

In some implementations, the filtering device 106 may identify a portion of the environmental data 108 that corresponds to a location. If the location satisfies an obfuscation criterion (e.g., the location is a sensitive location), the filtering device 106 may modify the environmental data 108 to obfuscate location data indicative of the location. The location data may include, for example, the image data frame 112 and/or the mesh map 122.

In some implementations, the filtering device 106 determines whether to modify the environmental data 108 based on a security classification of the location and/or a permission classification associated with a user. For example, in some implementations, the filtering device 106 determines whether to modify the environmental data 108 based on whether the location is classified as secure or nonsecure. In some implementations, the filtering device 106 determines whether to modify the environmental data 108 based on whether the user may be classified as a supervisor, a colleague, a subordinate, a trusted external colleague, a nontrusted external colleague, a customer, a family member, a friend, and/or a member of the general public.

In some implementations, the filtering device 106 is configurable to modify the environmental data 108 or to omit modifying the environmental data 108 based on a user input indicating that a user has opted into or has opted out of modification of the environmental data 108. The user input can be provided by one or more participants to a communication session and may be obtained after disclosing to the one or more participants that the environmental data 108 may be modified. In some implementations, the filtering device 106 modifies the environmental data 108 when all participants to a communication opt into modification of the environmental data 108.

Figure 2A:
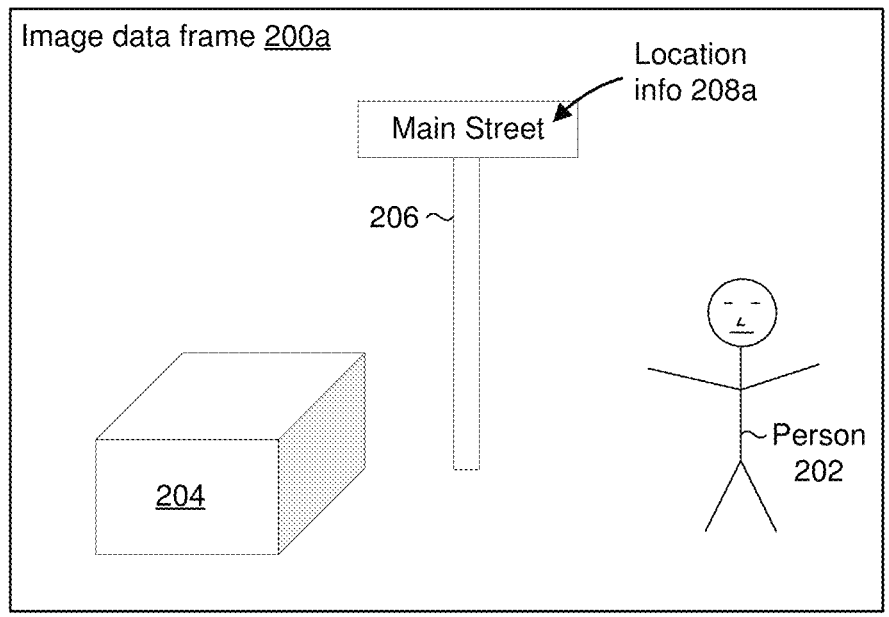
FIGS. 2A-2J are diagrams of example image data frames in accordance with some implementations.

FIG. 2A illustrates example environmental data that may be captured by the environmental sensor 102, e.g., an example image data frame 200a. The image data frame 200a includes pixels that represent a person 202, a car 204, a sign post 206, and location information 208a that is displayed on the sign post 206. In the example of FIG. 2A, the location information 208a includes a fictitious street name (e.g., Main Street). In some implementations, the location information 208a includes text that corresponds to a location of a certain location type. For example, in some implementations, the location information 208a may include a home address associated with the person 202. In some implementations, the location information 208a includes a representation (e.g., an image) of a physical article (e.g., a well-known physical article, for example, a famous landmark such as the Statue of Liberty).

In some implementations, the filtering device 106 obtains the image data frame 200a from the environmental sensor 102. For example, in some implementations, the camera 110 captures the image data frame 200a and provides the image data frame 200a to the filtering device 106. In some implementations, the image data frame 200a is part of a video feed. For example, in some implementations, the image data frame 200a is a video frame. In some implementations, the image data frame 200a is a still image frame.

Figure 2B:
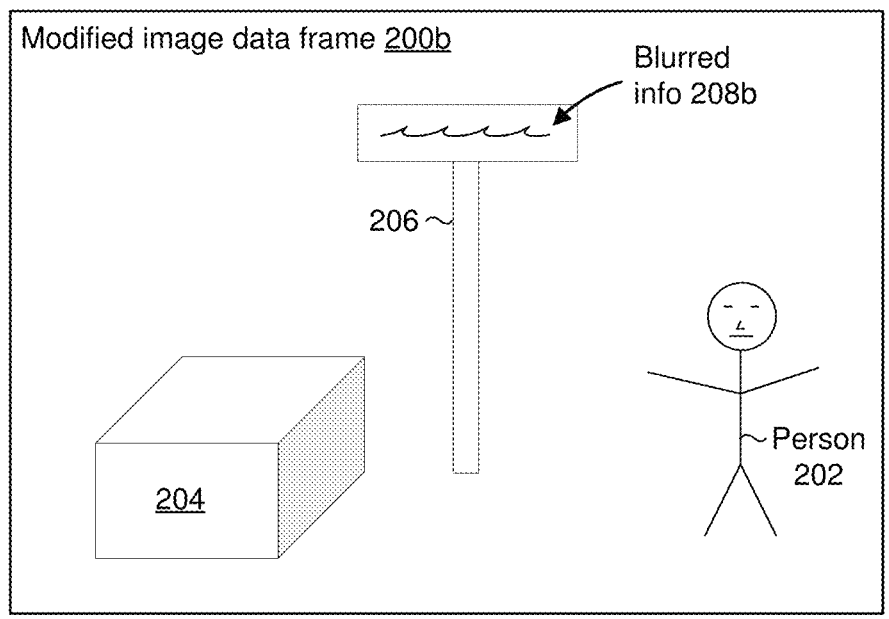

In some implementations, the filtering device 106 identifies the location information 208a as corresponding to a location and determines that the location is a specific type of location, e.g., a private residence. In response to making this determination, in some implementations, the filtering device 106 obfuscates the location information 208a indicative of the location from the image data frame 200a. FIG. 2B illustrates an example modified image data frame 200b. As illustrated in FIG. 2B, the sign post 206 displays blurred information 208b instead of the location information 208a shown in FIG. 2A, thus obfuscating information indicative of the location represented the image data frame 200a. The filtering device 106 modifies the pixels corresponding to the location information 208a in order to generate the blurred information 208b. In some implementations, the blurred information 208b is a blurred version (e.g., a distorted version) of the location information 208a. In some implementations, the blurred information 208b is not readily readable by a user of the client device 104. In some implementations, a display policy specifies one or more types of locations to be blurred. In the example of FIGS. 2A and 2B, a display policy specifies that names of streets within a threshold distance of a residential address of the person 202 are to be blurred.

Figure 2C:
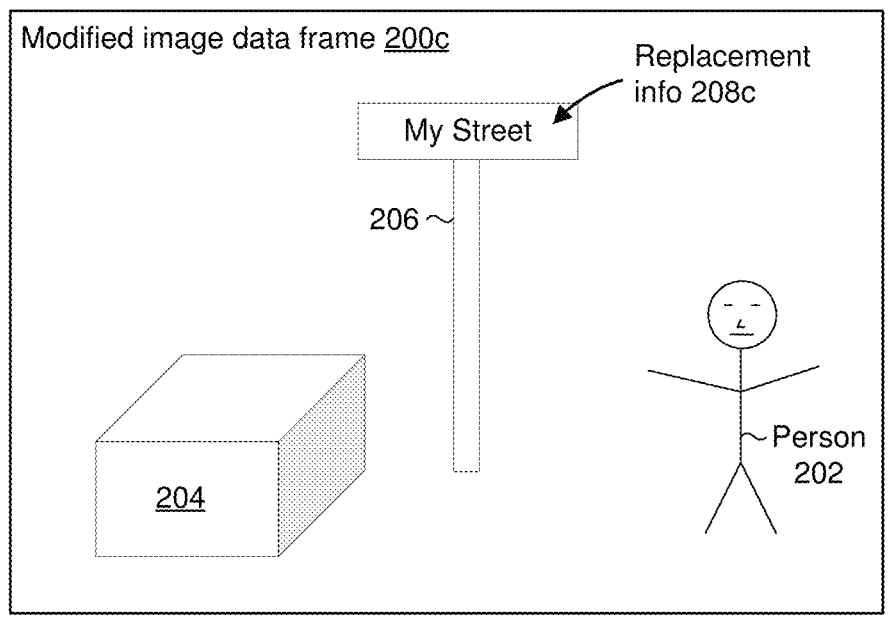

FIG. 2C illustrates another example modified image data frame 200c. As illustrated in FIG. 2C, in some implementations, the location information 208a shown in FIG. 2A is replaced with replacement information 208c. As a result, information indicative of the location represented in the image data frame 200a is obfuscated. In some implementations, a display policy specifies the replacement information 208c. For example, a display policy administered by an enterprise specifies that the location information 208a is to be replaced by a generic street name or a personalized street name. In the example of FIG. 2C, the filtering device 106 modifies the pixels corresponding to the location information 208a to display the replacement information 208c. In some implementations, the replacement information 208c is specified by a user of the client device 104. In some implementations, the replacement information 208c is specified by an entity that controls the environmental sensor 102 (e.g., a user of the camera 110).

Figure 2D:
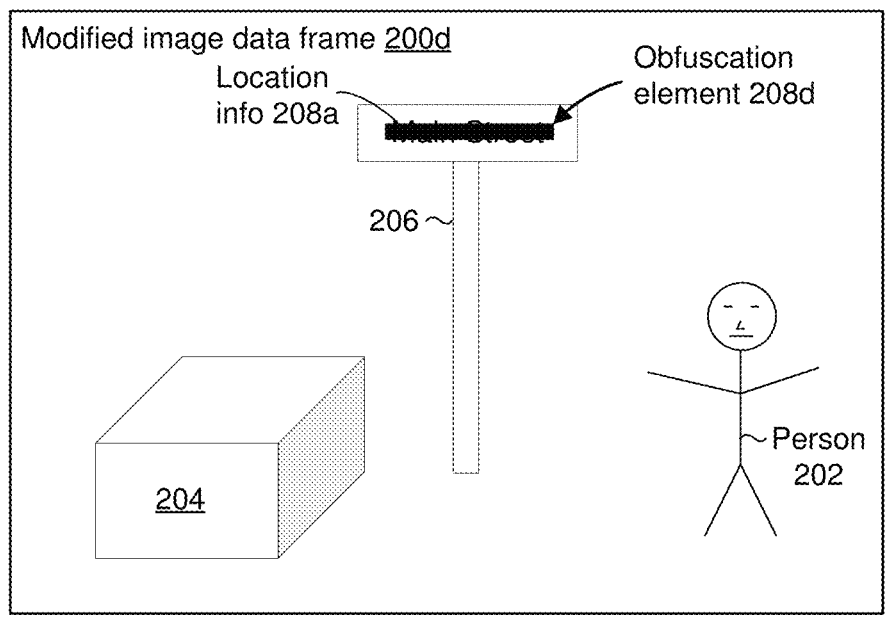

FIG. 2D illustrates another example modified image data frame 200d. As illustrated in FIG. 2D, an obfuscation element 208d obfuscates at least a portion of the location information 208a (e.g., a majority or all of the location information 208a). In the example of FIG. 2D, the obfuscation element 208d includes a colored shape (e.g., a black rectangle) that is overlaid on top of most of the location information 208a. As a result, information indicative of the location represented in the image data frame 200a is obfuscated. In some implementations, a display policy specifies how much of the location information 208a is to be obfuscated. In some implementations, a display policy specifies one or more locations, or one or more location types (e.g., bedrooms, bathrooms, change rooms and/or security checkpoints) to be obfuscated. For example, in some implementations, a display policy specifies that location information indicative of a change room is to be obfuscated. More generally, in various implementations, a display policy specifies that a type of location is to be obfuscated. For example, in some implementations, a display policy specifies that locations where people change clothes are to be obfuscated.

Figure 2E:
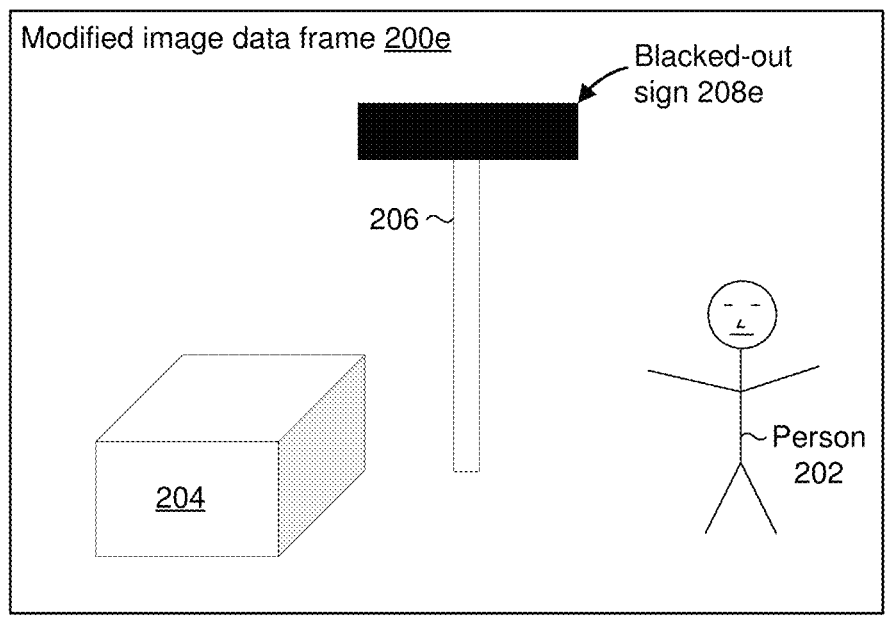

FIG. 2E illustrates another example modified image data frame 200e. As illustrated in FIG. 2E, the display displays a blacked-out sign 208e instead of the location information 208a shown in FIG. 2A. In the example of FIG. 2E, the filtering device 106 modifies the pixels corresponding to the sign post 206 so that all the pixels corresponding to the location information 208a are black in color. As a result, information indicative of the location represented in the image data frame 200a is obfuscated. More generally, in various implementations, the filtering device 106 modifies pixels indicative of a location so that all pixels indicative of the location display the same color (e.g., white, blue, green, etc.). In some implementations, a display policy specifies that all pixels indicative of bedrooms are to be modified such that the bedrooms appear blacked out. More generally, in various implementations, a display policy specifies that all pixels corresponding to a particular type of location (e.g., changing locations, security check points, etc.) are to be modified such that locations of that particular type are blacked out.

Figure 2F:
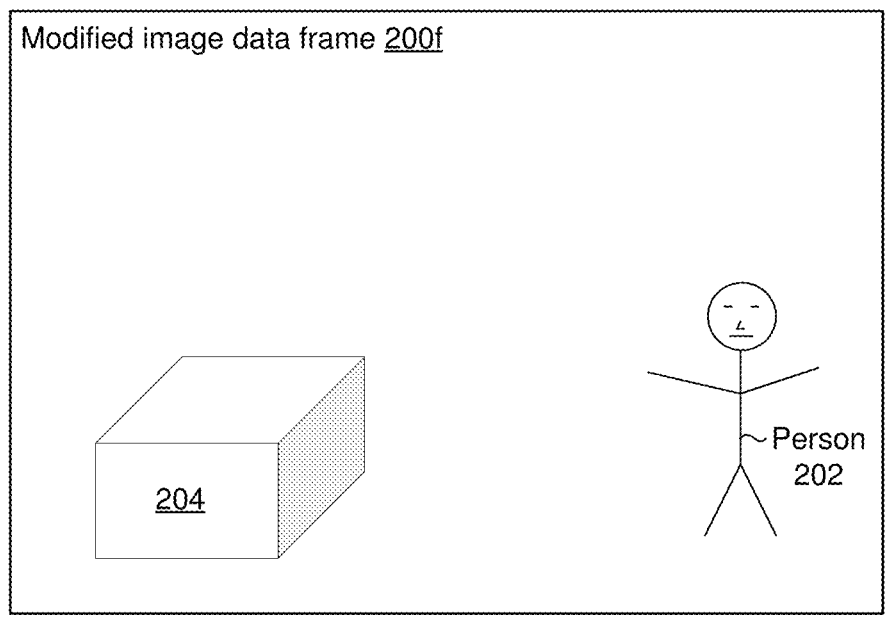

FIG. 2F illustrates another example modified image data frame 200f In some implementations, a display policy specifies that objects indicating a location of a particular type are to be removed from the image data frame. In the example of FIG. 2F, the display policy specifies that sign posts are to be removed from the image data frame 200a. As illustrated in FIG. 2F, in some implementations, the filtering device 106 removes the sign post 206 from the image data frame 200a to generate the modified image data frame 200f As a result, information indicative of the location represented in the image data frame 200a is obfuscated. As such, the sign post 206 is removed from the image data frame 200a in order to generate the modified image data frame 200f, as illustrated in FIG. 2F.

Figure 2G:
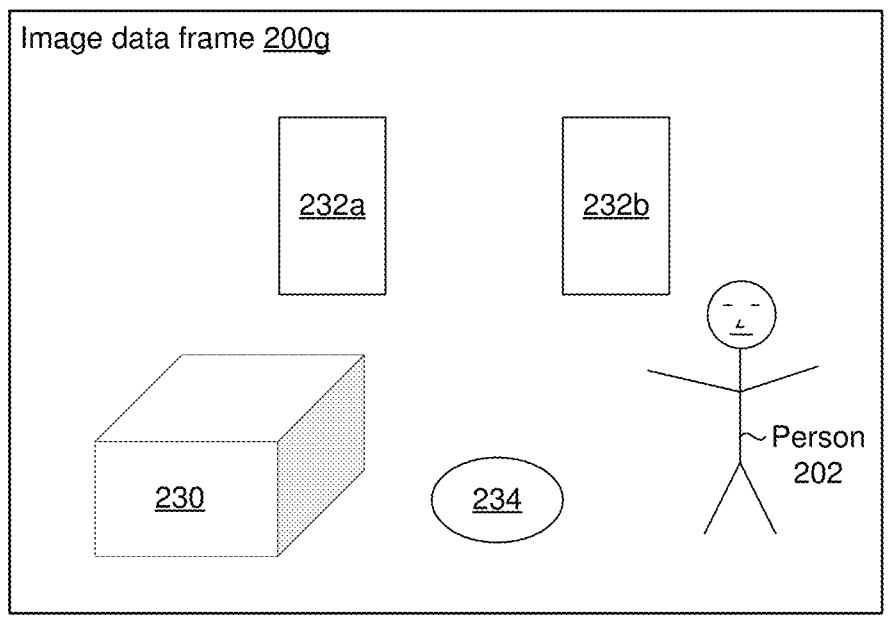

FIG. 2G illustrates example environmental data that may be captured by the environmental sensor 102, e.g., an example image data frame 200g. The image data frame 200g includes pixels that represent the person 202, a bed 230, family pictures 232a and 232b, and a beanbag 234. In some implementations, the furniture (e.g., the bed 230 and the beanbag 234) and the decor (e.g., the family pictures 232a, 232b) correspond to (e.g., are indicative of) a location of a certain location type, e.g., a bedroom or other personal space.

Figure 2H:
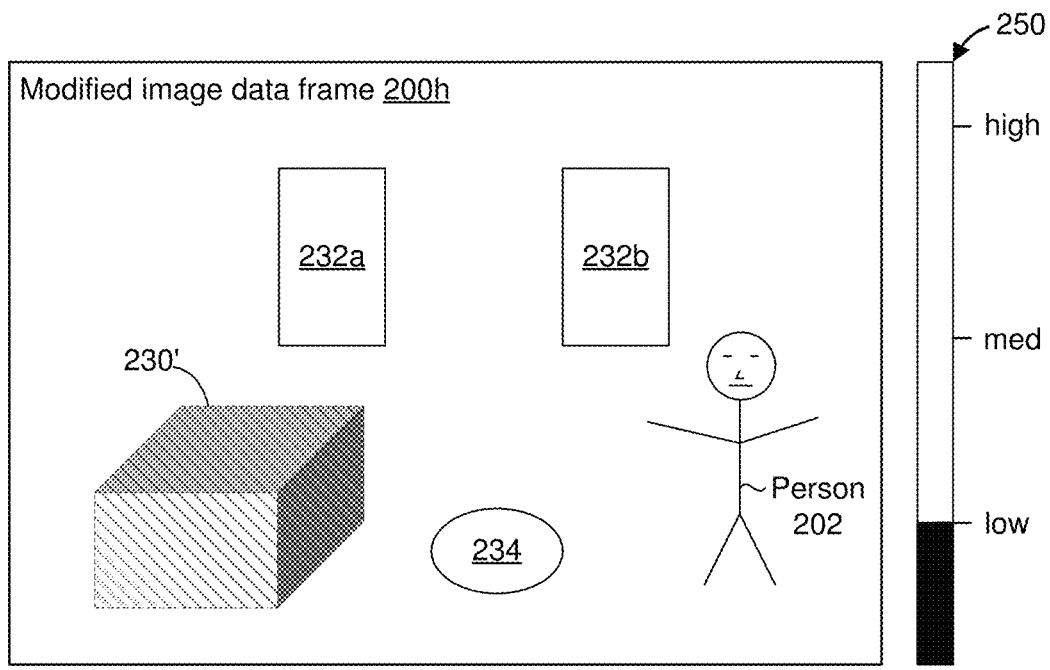

In some implementations, the filtering device 106 obfuscates location data that corresponds to a particular location type. For example, the filtering device 106 obfuscates a portion of location data from the image data frame 200g which is indicative of a bedroom. Referring to FIG. 2H, in some implementations, the filtering device 106 generates a modified image data frame 200h that includes an obfuscated bed 230'. In some implementations, the obfuscated bed 230' is a blurred version of the bed 230. In some implementations, the obfuscated bed 230' includes the bed 230 and an obfuscation element (e.g., an obfuscation element similar to the obfuscation element 208d shown in FIG. 2D) that is overlaid onto the bed 230. In some implementations, the obfuscated bed 230' includes a replacement object (e.g., a conference table). In some implementations, the obfuscated bed 230' is invisible. In some implementations, the obfuscated bed 230' obfuscates items (e.g., bedding, people, etc.) that are located on the bed 230. In some implementations, the obfuscated bed 230' is beyond a degree of similarity from the bed 230. As such, while the bed 230 is indicative of a bedroom, the obfuscated bed 230' is not indicative of a bedroom.

In some implementations, the filtering device 106 obfuscates location data in accordance with a degree of obfuscation 250. In some implementations, the degree of obfuscation 250 indicates an amount of location data that is obfuscated. In the example of FIG. 2H, generating the modified image data frame 200h corresponds to a low degree of obfuscation, for example, because the family pictures 232a and 232b are not obfuscated. Obfuscating the bed 230 has removed an indication that the modified image data frame 200h corresponds to a bedroom. However, the unobfuscated family pictures 232a and 232b may still indicate that the modified image data frame 200h corresponds to a personal space (e.g., a home office, or a family room).

Figure 2I:
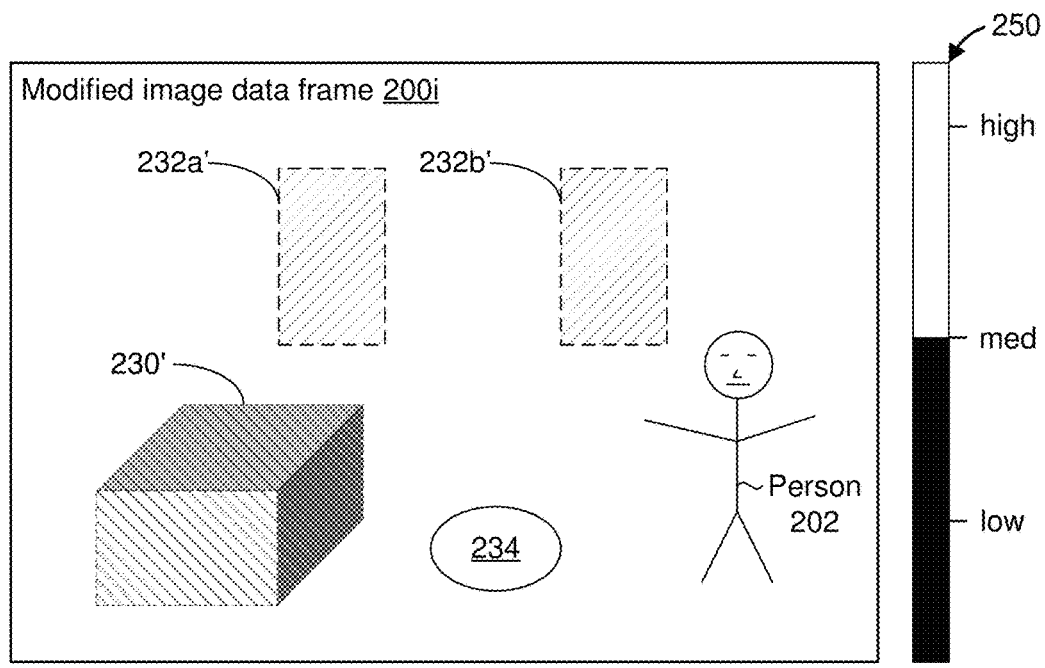

Referring to FIG. 2I, in some implementations, the filtering device 106 obfuscates the family pictures 232a and 232b. In the example of FIG. 2I, the filtering device 106 generates a modified image data frame 200i that includes obfuscated pictures 232a' and 232b'. In some implementations, the obfuscated pictures 232a' and 232b' are blurred versions of the family pictures 232a and 232b, respectively. In some implementations, the obfuscated pictures 232a' and 232b' includes the family pictures 232a and 232b, respectively, and respective obfuscation elements (e.g., obfuscation elements similar to the obfuscation element 208d shown in FIG. 2D) that are overlaid onto the family pictures 232a and 232b. In some implementations, the obfuscated pictures 232a' and 232b' includes replacement pictures (e.g., stock pictures, or pictures with business colleagues to whom the modified image data frame 200i is being transmitted). In some implementations, the obfuscated pictures 232a' and 232b' are invisible. Obfuscating the family pictures 232a and 232b may correspond to a medium degree of obfuscation. Obfuscating the bed 230 and the family pictures 232a and 232b has removed an indication that the modified image data frame 200i corresponds to a personal space.

Figure 2J:
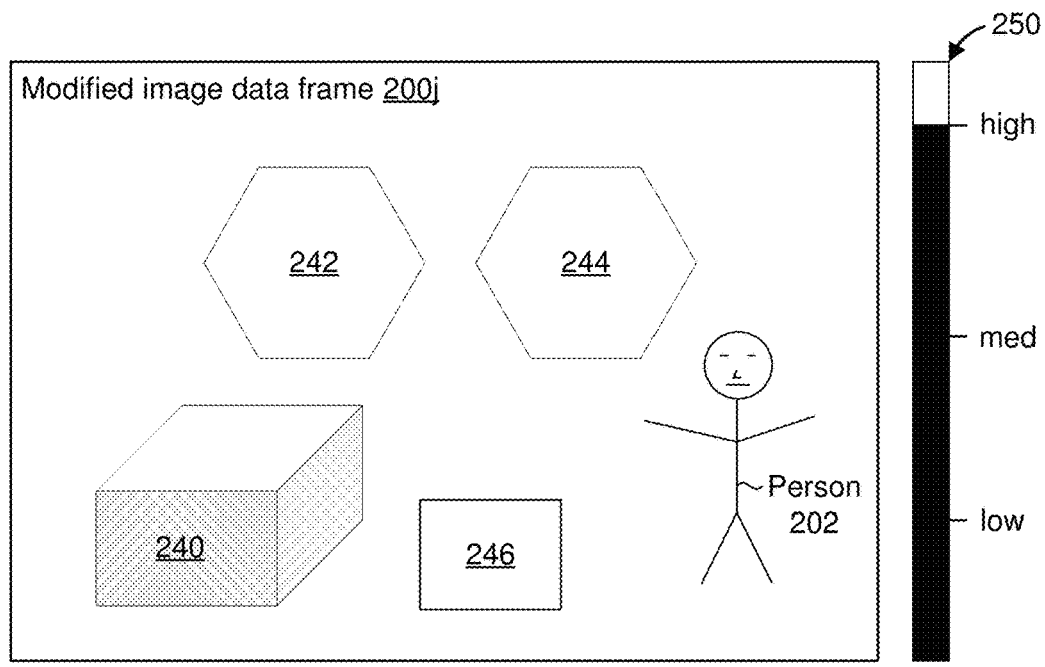

FIG. 2J illustrates example modified environmental data that may be generated by the filtering device 106. In some implementations, the modified environmental data includes a modified image data frame 200j. As illustrated in FIG. 2J, pixels corresponding to furniture and decor that correspond to (e.g., are indicative of) a location of one location type (e.g., a bedroom or other personal space) are replaced with replacement pixels corresponding to furniture and decor that correspond to (e.g., that are indicative of) another location of another location type (e.g., an office or other professional space). For example, the pixels corresponding to the bed 230 are replaced with replacement pixels corresponding to a conference table 240. The pixels corresponding to the family pictures 232a, 232b are replaced with pixels corresponding to a certificate 242 and a diploma 244, respectively. The pixels corresponding to the beanbag 234 are replaced with pixels corresponding to an office chair 246. In some implementations, the modified environmental data includes a modified mesh map with modified depth information. For example, in some implementations, the depth information corresponding to the beanbag 234 is replaced with modified depth information corresponding to (e.g., consistent with) the office chair 246.

In some implementations, generating the modified image data frame 200j corresponds to a high degree of obfuscation. The modified image data frame 200j indicates a location type that is beyond a degree of similarity from a location type indicated by the image data frame 200g. For example, the image data frame 200i is indicative of a bedroom, whereas the modified image data frame 200j is indicate of an office environment (e.g., a private office).

In various implementations, the filtering device 106 determines the degree of obfuscation 250. In some implementations, the filtering device 106 determines the degree of obfuscation 250 based on an input (e.g., a user input provided by a person controlling the environmental data source 101). In some implementation, the filtering device 106 determines the degree of obfuscation 250 based on a user type and/or a permission type associated with the client device 104. For example, if the client device 104 is associated with a colleague, then the filtering device 106 performs a low degree of obfuscation. In some examples, if the client device 104 is associated with a supervisor, then the filtering device 106 performs a medium degree of obfuscation. In some examples, if the client device 104 is associated with a customer, then the filtering device 106 performs a high degree of obfuscation.

In some implementations, the filtering device 106 limits (e.g., omits) altering the appearance of any representations of persons in the modified image data frames 200b, 200c, 200d, 200e, 200f, 200h, 200i, and 200j (e.g., regardless of a configured degree of obfuscation) in order to maintain authenticity of the representations of persons. Accordingly, in some implementations, the filtering device 106 ensures that representations of persons are within a threshold degree of similarity to the corresponding persons. Limiting (e.g., omitting) altering the appearance of representations of persons may promote user confidence in the trustworthiness of communications conducted using the filtering device 106.

Figure 3:
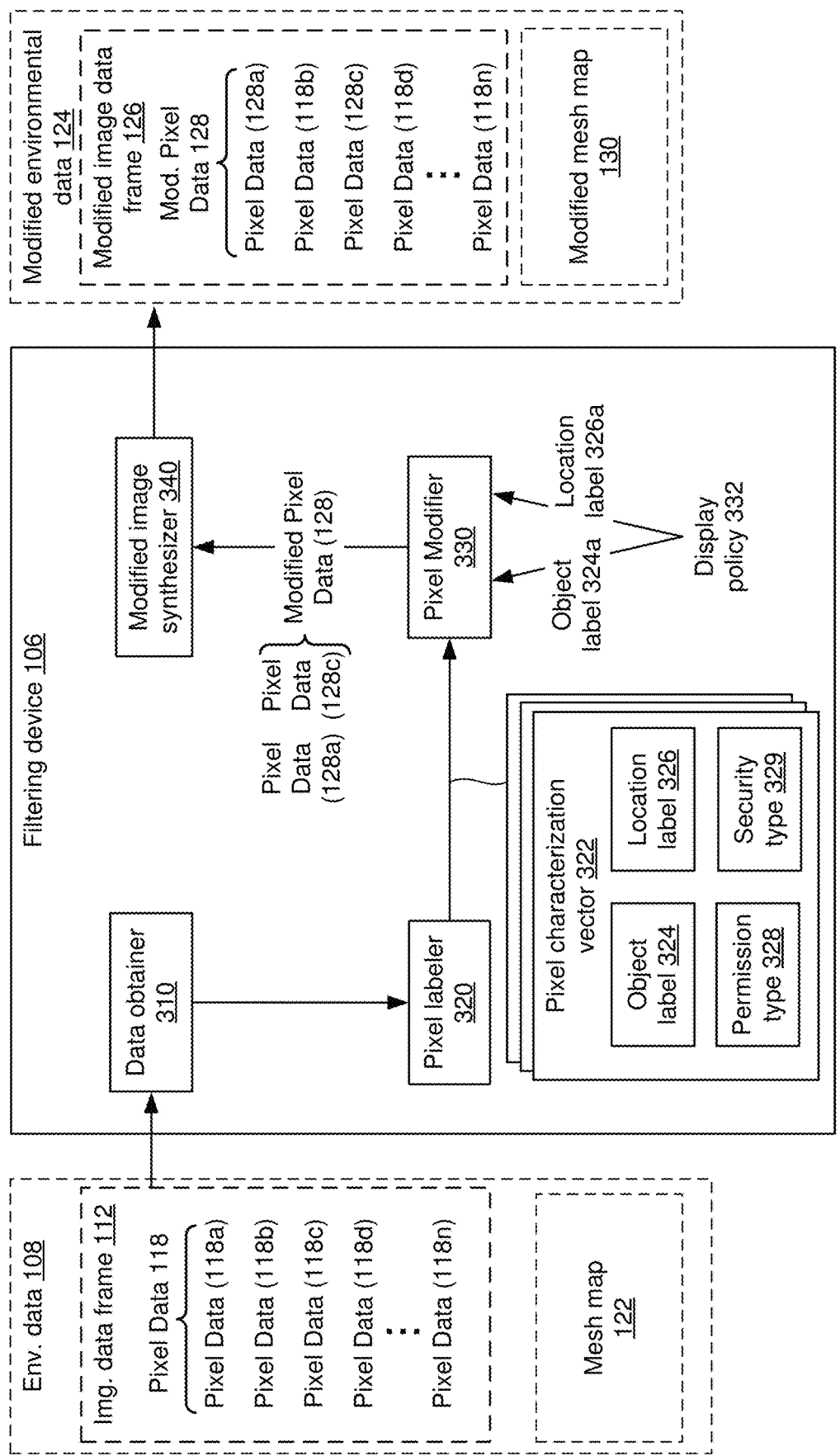
FIG. 3 is a block diagram of an example filtering device in accordance with some implementations.

FIG. 3 illustrates the filtering device 106 in accordance with some implementations. In some implementations, the filtering device 106 includes a data obtainer 310, a pixel labeler 320, a pixel modifier 330, and a modified image synthesizer 340. In various implementations, the data obtainer 310 obtains environmental data corresponding to a physical environment. For example, in some implementations, the data obtainer 310 obtains the environmental data 108 of FIG. 1. The environmental data 108 may include the image data frame 112 and/or the mesh map 122. In some implementations, the data obtainer 310 receives the image data frame 112 and/or the mesh map 122, for example, from the environmental sensor 102 shown in FIG. 1 (e.g., the camera 110 and/or the depth sensor 120). In some implementations, the data obtainer 310 obtains a video feed and extracts image data frames from the video feed.

In various implementations, the pixel labeler 320 generates a respective pixel characterization vector 322 for each of the pixels in the image data frame 112. In some implementations, each pixel characterization vector 322 includes an object label 324 indicating an object type that the corresponding pixel represents. In some implementations, each pixel characterization vector 322 includes a location label 326 that indicates a location associated with (e.g., indicated by) the corresponding pixel. For example, the location label 326 may include GPS location information. The location label 326 may include intra-building location information, such as information regarding a room within a building. In some implementations, the location label 326 includes a location type, such as home, office, public, private, etc.

In some implementations, the pixel labeler 320 utilizes a machine learning segmentation system in order to generate the pixel characterization vectors 322 and determine the object labels 324. In some implementations, the pixel labeler 320 uses the machine learning segmentation system to determine the location labels 326. In some implementations, the pixel labeler 320 utilizes a neural network in order to determine the object labels 324 and/or the location labels 326. For example, in some implementations, the pixel labeler 320 utilizes a neural network in order to classify each pixel in the image data frame 112 into one of a variety of known object types and/or location types. In some implementations, the pixel labeler 320 is trained with training data that includes images along with human-curated object labels and/or location labels for various pixels in the images.

In various implementations, the pixel modifier 330 modifies corresponding pixel data of pixels having a first object label 324*a*. In some implementations, the pixel modifier 330 obtains a display policy 332 (e.g., an obfuscation policy, for example, a location-based obfuscation policy) that specifies that pixels corresponding to the first object label 324*a* are to be obfuscated. In some implementations, the pixel modifier 330 modifies the pixel data of pixels that are associated with the first object label 324*a* in order to obfuscate an object referenced by the first object label 324*a*. For example, in some implementations, the first object label 324*a* refers to information that is displayed on a display. In such implementations, the pixel modifier 330 modifies the pixel values of all pixels that correspond to information that is displayed on a display.

In some implementations, the pixel modifier 330 modifies corresponding pixel data of pixels having a first location label 326*a*. In some implementations, the display policy 332 specifies that pixels corresponding to the first location label 326*a* are to be obfuscated. In some implementations, the pixel modifier 330 modifies the pixel data of pixels that are associated with the first location label 326*a* in order to obfuscate a location referenced by the first location label 326*a*. For example, in some implementations, the first location label 326*a* refers to home address information that is displayed in front of a home (e.g., on a mailbox). In such implementations, the pixel modifier 330 modifies the pixel values of all pixels that correspond to home address information that is displayed on a display. In some implementations, the first location label 326*a* refers to names of streets that are within a threshold distance of the home address (e.g., the location information 208*a* shown in FIG. 2A). In such implementations, the pixel modifier 330 modifies the pixel values of all pixels that correspond to names of streets that are within the threshold distance of the home address.

In various implementations, the pixel modifier 330 generates modified pixel data 128. For example, the pixel modifier 330 generates modified pixel data 128*a* for the first pixel in the image data frame 112, and modified pixel data 128*c* for the third pixel in the image data frame 112. In some implementations, the pixel modifier 330 provides the modified pixel data 128 to the modified image synthesizer 340. In some implementations, the modified pixel data 128 includes RGB values for pixels that have the first object label 324*a*. In some implementations, the modified pixel data 128 includes RGB values for pixels that have the first location label 326*a*.

In various implementations, the modified image synthesizer 340 synthesizes the modified image data frame 126 based on the modified pixel data 128. The modified image data frame 126 synthesized by the modified image synthesizer 340 includes the modified pixel data 128 for the pixels that have the first object label 324*a* or the first location label 326*a*, and unmodified pixel data for the pixels that do not have the first object label 324*a* or the first location label 326*a*. In the example of FIG. 3, the modified image data frame 126 includes the modified pixel data 128 for the first pixel and the third pixel, and unmodified pixel data for the second pixel, the fourth pixel, and the nth pixel. In some implementations, the modified image synthesizer 340 provides the modified image data frame 126 to a rendering and display pipeline. In some implementations, the modified image synthesizer 340 transmits the modified image data frame 126 to another device that displays the modified image data frame 126.

In some implementations, the first object label 324*a* identifies a first object type, and the display policy 332 specifies that all objects of the first object type are to be obfuscated. In such implementations, the pixel modifier 330 identifies all pixels that have the first object label 324*a* and performs an obfuscation operation on the identified pixels in order to obfuscate objects of the first object type. For example, in some implementations, the display policy 332 specifies that computer display screens are to be obfuscated.

In some implementations, the first location label 326*a* identifies a first location type, and the display policy 332 specifies that objects associated with (e.g., indicative of) the first location type are to be obfuscated. In some implementations, the pixel modifier 330 identifies pixels that have the first location label 326*a* and performs an obfuscation operation on the identified pixels to obfuscate objects associated with the first location type. For example, in some implementations, the display policy 332 specifies that objects indicative of a bedroom (e.g., a bed) are to be obfuscated. In such implementations, the pixel modifier 330 obfuscates pixels that represent objects associated with a bedroom (e.g., the bed). In some implementations, the display policy 332 specifies that objects indicative of a security checkpoint are to be obfuscated (e.g., metal detectors, body scanners, security guards, security cameras, etc.). In such implementations, the pixel modifier 330 obfuscates pixels that represent objects associated with a security checkpoint (e.g., the metal detectors, the body scanners, the security guards, the security cameras, etc.).

In some implementations, the display policy 332 is specified by an entity that controls the environmental sensor 102 (e.g., a user of the camera 110). In some implementations, the display policy 332 is provided by a user (e.g., by a user of the client device 104 shown in FIG. 1). In some implementations, the display policy 332 is specified by another entity, such as an enterprise. In some implementations, the display policy 332 is specified by an entity that controls a portion of a physical environment where the client device is located. For example, if the client device is located at an airport, then an organization responsible for airport security may specify the display policy 332.

In some implementations, the obfuscation operation performed by the pixel modifier 330 includes a blurring operation. For example, as shown in FIG. 2B, in some implementations, the pixel modifier 330 changes the pixel values of pixels that have the first object label 324 or the first location label 326 in order to generate the blurred information 208b. In some implementations, blurring the pixels results in obfuscation of the pixels because blurring the pixels reduces the clarity of the pixels (e.g., blurring pixels that correspond to text reduces the readability of the text).

In some implementations, the obfuscation operation performed by the pixel modifier 330 includes changing pixel values to a particular color (e.g., black, white, blue, green, etc.). For example, as shown in FIG. 2E, the pixel modifier 330 changes the pixel values of pixels corresponding to the street name to black.

In some implementations, the obfuscation operation includes superimposing an obfuscation element on objects that have the first object label 324a or are associated with the first location label 326a. For example, as shown in FIG. 2D, the pixel modifier 330 overlays the obfuscation element 208d on top of the location information 208a in order to obfuscate the location information 208a.

In some implementations, the obfuscation operation performed by the pixel modifier 330 includes removing objects that have the first object label 324a or are associated with the first location label 326a. For example, as shown in FIG. 2F, the pixel modifier 330 removes the sign post 206 in order to generate the modified image data frame 200f.

In some implementations, the pixel labeler 320 adds a respective permission type 328 to the pixel characterization vectors 322. In some implementations, the permission type 328 indicates a permission level for a corresponding user type. Some example user types include, but are not limited to the following: supervisors, colleagues, subordinates, trusted external colleagues, nontrusted external colleagues, customers, family members, friends, and members of the general public.

For example, in some implementations, the permission type 328 indicates that for users that are categorized as customers, location data indicative of a home office (e.g., home décor) is to be replaced with location data indicative of a corporate office (e.g., office décor). In some implementations, the permission type 328 indicates that for users that are categorized as colleagues or company employees, location data indicative of a home office is to be blurred. In some implementations, the permission type 328 indicates that for users that are colleagues, a first portion of the location data indicative of a home office (e.g., family photos) is to be obfuscated and a second portion of the location data indicative of the home office (e.g., whiteboards) is not to be obfuscated. In some implementations, the permission type 328 indicates that for users that are categorized as family members, the second portion of the location data indicative of the home office (e.g., the whiteboards) is to be obfuscated and the first portion of the location data indicative of the home office (e.g., the family photos) is not to be obfuscated.

In some implementations, the pixel labeler adds a respective security type 329 to the pixel characterization vectors 322. In some implementations, the security type 329 indicates a security level for a location. Some example security types include, but are not limited to the following: secure and nonsecure. In some implementations, a degree of obfuscation performed by the pixel modifier 330 is based on the security type 329 of a location. For example, if the location is a nonsecure location, the pixel modifier 330 may perform a blurring operation on pixels corresponding to a display. On the other hand, if the location is a secure location, the pixel modifier 330 may change the pixel values of pixels corresponding to the display to black.

In some implementations, a degree of obfuscation performed by the pixel modifier 330 is based on the permission type 328 and a type of the end user. For example, if the end user is a customer, then the pixel modifier 330 replaces location data indicative of a home office with location data indicative of a corporate office. If the end user is a colleague, then the pixel modifier 330 obfuscates a first portion of location data indicative of a home office (e.g., removes all family photos) and forgoes obfuscating a second portion of the location data indicative of the home office (e.g., the pixel modifier 330 leaves the whiteboards unmodified). If the end user is a family member, then the pixel modifier 330 obfuscates the second portion of the location data indicative of the home office (e.g., the pixel modifier 220 obfuscates all whiteboards) and forgoes obfuscating the first portion of the location data indicative of the home (e.g., the pixel modifier 330 leaves the family photos unmodified). More generally, in various implementations, the pixel modifier 330 generates the modified pixel data 128 based on the permission type 328 and a user type of the end user (e.g., a user type of the client device 104).

In some implementations, the pixel labeler 320 flags pixels having the first object label 324a or the first location label 326a. In some implementations, the pixel labeler 320 sets a flag in metadata of the pixel data. For example, the pixel labeler 320 sets a flag in the metadata of pixel data that have the first object label 324a or the first location label 326a, and the pixel labeler 320 does not set the flag in the metadata of pixel data that do not have the first object label 324a or the first location label 326a.

As described herein, in some implementations, the data obtainer 310 receives the environmental data 108 from the environmental sensor 102 (e.g., the camera 110). As such, in some implementations, the environmental data 108 corresponds to a physical environment. In some implementations, the first object label 324a references (e.g., specifies or identifies) a physical article, and the first location label 326a references (e.g., specifies or identifies) a physical location.

As described herein, in some implementations, the data obtainer 310 receives the environmental data 108 from the XR system 116. As such, in some implementations, the environmental data 108 corresponds to an XR environment. In some implementations, the XR environment includes a virtual environment. In some implementations, the XR environment includes an augmented reality (AR) environment, a virtual reality (VR) environment, a composite reality (CR) environment, and/or a mixed reality (MR) environment. In some implementations, the first object label 324a references (e.g., specifies or identifies) an XR object (e.g., a virtual object, for example, an AR object, a VR object, or an MR object), and the first location label 326a references (e.g., specifies or identifies) a location in an XR environment.

FIGS. 4A and 4B are a flowchart representation of a method 400 for obfuscating location data in accordance with some implementations. In various implementations, the method 400 is performed by a device (e.g., the filtering device 106 shown in FIGS. 1 and 3). In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, in various implementations, the method 400 includes obtaining environmental data corresponding to a physical environment, identifying a portion of the environmental data that corresponds to a location, and in response to the location being of a first location type, modifying the portion of the environmental data to obfuscate location data indicative of the location.

As represented by block 410, in various implementations, the method 400 includes obtaining environmental data corresponding to a physical environment via an environmental sensor. As represented by block 410a, in some implementations, the environmental data includes an image and/or a mesh map. The image may be, for example, an image data frame (e.g., the image data frame 112 of FIG. 1 and/or the image data frame 200a of FIG. 2A). In some implementations, a mesh map (e.g., the mesh map 122 of FIG. 1) may include information from a depth sensor.

In some implementations, as represented by block 410b, an image data frame is captured. The environmental sensor may include the camera 110 and/or the depth sensor 120. In some implementations, the image data frame (e.g., the image data frame 112 or the image data frame 200a) includes a plurality of pixels. In some implementations, each pixel is associated with respective pixel data. For example, as shown in FIG. 1, a first pixel of the image data frame 112 is associated with the first pixel data 118a, a second pixel of the image data frame 112 is associated with the second pixel data 118b, and an nth pixel of the image data frame 112 is associated with the nth pixel data 118n.

As represented by block 410c, in some implementations, the method 400 includes capturing a video feed that includes the image data frame. For example, in some implementations, the image data frame is a video frame that is extracted from a video. The video feed may be captured using the environmental sensor, e.g., the camera 110. In some implementations, the video is a pre-recorded video. Alternatively, in some implementations, the video is a live video (e.g., a livestream).

In some implementations, as represented by block 410d, the method 400 includes receiving the image data frame from another device. For example, as shown in FIG. 1, in some implementations, the method 400 includes receiving the image data frame 112 from the datastore 114 or the XR system 116.

As represented by block 410e, in some implementations, the image data frame corresponds to a physical environment. For example, as shown in FIG. 1, in some implementations, the image data frame 112 is captured by the camera 110.

Alternatively, in some implementations, as represented by block 410f, the image data frame corresponds to a graphical environment such as an extended reality (XR) environment. For example, as shown in FIG. 1, in some implementations, the image data frame 112 is generated by the XR system 116.

As represented by block 420, in various implementations, the method 400 includes identifying a first portion of the environmental data that corresponds to a first location. For example, as represented by block 420a, in some implementations, the filtering device 106 generates a respective pixel characterization vector for each of the plurality of pixels. In some implementations, as shown in FIG. 3, the pixel labeler 320 generates the pixel characterization vector 322 for each pixel in the image data frame 112.

As represented by block 420b, in some implementations, each pixel characterization vector 322 includes an object label and/or a location label (e.g., the location label 326 shown in FIG. 3). For example, as shown in FIG. 3, each pixel characterization vector 322 includes an object label 324 indicating an object type that the corresponding pixel represents.

As represented by block 420c, in some implementations, the object label 324 identifies a real object or a graphical object such as an XR object. For example, in some implementations, the image data frame is a video frame that is extracted from a video, and the object label identifies a real object. In some implementations, the image data frame corresponds to an XR environment, and the object label 324 identifies an XR object (e.g., an AR object, a VR object, or an MR object). In some implementations, an XR object refers to an object that exists in an XR experience.

In some implementations, each pixel characterization vector 322 includes a location label 326 that indicates a location associated with (e.g., indicated by) the corresponding pixel. As represented by block 420d, in some implementations, the location label 326 includes GPS location information, intra-building location information, and/or a location type. Intra-building location information identifies a location within a building, such as a particular room or other area. In some implementations, the location label 326 includes a location type, such as home, office, public, private, etc.

As represented by block 420e, in some implementations, a pixel labeler and/or a machine learning segmentation system generates the pixel characterization vectors. For example, as shown in FIG. 1, the pixel labeler 320 generates the pixel characterization vectors 322. In some implementations, a machine learning segmentation system generates the pixel characterization vectors 322. In some implementations, the pixel labeler 320 utilizes a neural network in order to generate the pixel characterization vectors 322 and/or to determine the object labels 324 and/or location labels 326 included in the pixel characterization vectors 322. In some implementations, the method 400 includes training the pixel labeler and/or the machine learning segmentation system in order to identify the location type of an object represented by a pixel. In some implementations, the method 400 includes providing training data to the pixel labeler and/or the machine learning segmentation system. In some implementations, the training data includes images and operator-curated (e.g., human-curated) labels that identify location types in the images.

Referring to FIG. 4B, as represented by block 430, in various implementations, the method 400 includes obfuscating, from the environmental data, location data indicative of the first location in response to the first location being of a first location type. The location data is obfuscated by modifying the first portion of the environmental data.

As represented by block 430a, in some implementations, the location data indicative of the first location is obfuscated by modifying pixel data for a plurality of pixels. For example, in some implementations, the filtering device 106 modifies corresponding pixel data of the plurality of pixels having a first location label. For example, as shown in FIG. 3, the pixel modifier 330 modifies the pixel data for the first pixel and the third pixel. In some implementations, the method 400 includes generating modified pixel data for pixels having the first location label and replacing pixel data of the pixels having the first location label with corresponding modified pixel data. For example, as shown in FIG. 3, the pixel modifier 330 generates the modified pixel data 128a and 128c for the first pixel and the third pixel, respectively. In the example of FIG. 3, the pixel modifier 330 replaces the pixel data of the first pixel and the third pixel with the modified pixel data 128a and 128c, respectively. In various implementations, modifying pixel data of pixels having the first location label allows obfuscation of location data corresponding to the first location label while still allowing users to view objects that do not correspond to the first location label, thereby improving the operability of the device and enhancing user experience.

In some implementations, the method 400 includes changing corresponding pixel values of the plurality of pixels having the first location label. In some implementations, as represented by block 430b, the pixel data includes RGB data, and the method 400 includes changing the RGB values of the pixels having the first location label. In some implementations, the method 400 includes setting the corresponding pixel values to a particular color (e.g., black, white, green, blue, etc.). For example, as shown in FIGS. 2A and 2E, the filtering device 106 sets the pixel values corresponding to the location information 208a to black in order to display the blacked-out sign 208e.

In some implementations, the method 400 includes identifying pixels of the plurality of pixels having the first location label. For example, as shown in FIG. 3, the pixel modifier 330 identifies pixels in the image data frame 112 that have the first object label 324a or the first location label 326a. In some implementations, the method 400 includes comparing the object labels included in the pixel characterization vectors with the first object label 324a in order to identify the pixels having the first object label 324a. For example, as shown in FIG. 3, the pixel modifier 330 compares the pixel characterization vectors 322 with the first object label 324a in order to identify the pixels having the first object label 324a. In some implementations, the method 400 includes comparing the location labels included in the pixel characterization vectors with the first location label 326a in order to identify the pixels having the first location label 326a. For example, as shown in FIG. 3, the pixel modifier 330 compares the pixel characterization vectors 322 with the first location label 326a in order to identify the pixels having the first location label 326a.

As represented by block 430c, in some implementations, the method 400 includes modifying the pixel data for the plurality of pixels based on a security classification of the first location and/or a permission level associated with a user type. For example, the pixel data may be modified based on the permission type 328 included in the pixel characterization vector 322. The pixel data may be modified based on the security type 329 included in the pixel characterization vector 322.

In some implementations, as represented by block 430d, the security type 329 may be a secure type or a nonsecure type. For example, the lobby and other public areas of an office building may be designated as nonsecure areas. The pixel characterization vector 322 for a pixel corresponding to the lobby may have the security type 329 set to a nonsecure type. On the other hand, a private office may be designated as a secure area. The pixel characterization vector 322 for a pixel corresponding to a private office may have the security type 329 set to a secure type.

In some implementations, as represented by block 430e, the permission type 328 may be associated with a user type. Users may be classified into different types based on a number of considerations. Some of these considerations include, but are not limited to, a user's relationship to an organization (e.g., internal or external), a user's position relative to another user, and/or, more generally, a user's relationship to another user. In some implementations, some example user types include, but are not limited to, a supervisor user type, a colleague user type, a subordinate user type, a trusted external colleague user type, a nontrusted external colleague user type, a customer user type, a family member user type, a friend user type, and/or a general public user type.

As represented by block 430f, in some implementations, the method 400 includes replacing pixels indicative of a first location with replacement pixels indicative of a second location of a second location type. For example, in some implementations, as shown in FIGS. 2G-2J, pixels indicative of a bedroom or other personal space are replaced with pixels indicative of an office or other professional space.

As represented by block 430g, in some implementations, the method 400 includes generating (e.g., synthesizing) a first modified image data frame that includes modified pixel data for the plurality of pixels having the first object label or the first location label, and unmodified pixel data for the plurality of pixels not having the first object label or the first location label. For example, as shown in FIGS. 1 and 3, the filtering device 106 (e.g., the modified image synthesizer 340) synthesizes the modified image data frame 126 that includes modified pixel data 128 for the first pixel and the third pixel, and unmodified pixel data 118b and 118d for the second pixel and the fourth pixel.

As represented by block 430h, in some implementations, the method 400 includes providing the first modified image data frame to a rendering and display pipeline. For example, the filtering device 106 (e.g., the modified image synthesizer 340) provides the modified image data frame 126 to a rendering and display pipeline. In some implementations, as represented by block 430i, the method 400 includes transmitting the first modified image data frame to another device. For example, as shown in FIG. 1, the filtering device 106 transmits the modified image data frame 126 to the client device 104. In some implementations, as represented by block 430j, the method 400 includes displaying the first modified image data frame on a display in communication with the device. For example, the client device 104 shown in FIG. 1 displays the modified image data frame 126 on a display of the client device 104.

In various implementations, synthesizing the modified image data frame reduces the need to block transmittal of image data frames in order to avoid transmitting certain information, such as sensitive location information. As discussed herein, being able to transmit and/or receive image data frames tends to provide an enhanced user experience. In some implementations, synthesizing the modified image data frame reduces the need for a sequence of user inputs that correspond to manually turning video transmission on or off in order to avoid transmitting undesirable information. Reducing user inputs tends to decrease the amount of time that a display has to be kept on, thereby extending the battery life of battery-operated devices and improving their operability.

Figure 5:
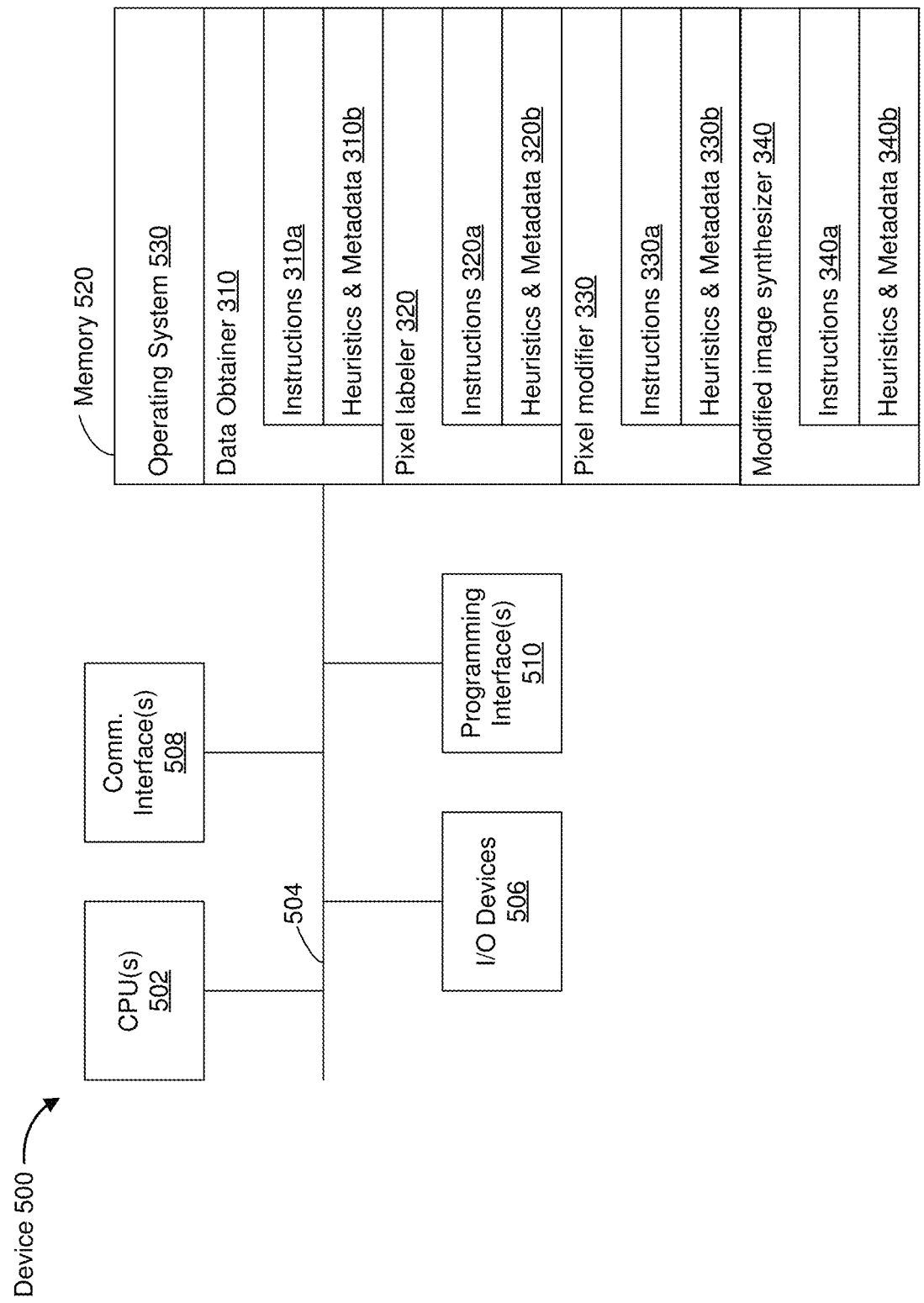
FIG. 5 is a block diagram of a device that obfuscates location data in accordance with some implementations.

FIG. 5 is a block diagram of a device 500 (e.g., the filtering device 106 shown in FIGS. 1 and 3) that obfuscates location data by modifying a portion of environmental data in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the device 500 includes one or more processing units 502 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 506, one or more communication interfaces 508 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 510, a memory 520, and one or more communication buses 504 for interconnecting these and various other components.

In some implementations, the one or more communication buses 504 include circuitry that interconnects and controls communications between system components. In some implementations, the one or more I/O devices 506 include at least one of a keyboard, a mouse, a touchpad, a joystick, one or more microphones, one or more speakers, one or more image sensors (e.g., one or more cameras, for example, a front-facing camera), one or more displays (e.g., one or more XR displays), and/or the like.

The memory 520 may include high-speed random-access memory, such as dynamic random-access memory (DRAM), static random-access memory (SRAM), double-data-rate random-access memory (DDR RAM), or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 comprises a non-transitory computer readable storage medium. In some implementations, the memory 520 or the non-transitory computer readable storage medium of the memory 520 stores the following programs, modules and data structures, or a subset thereof including an optional operating system 530, the data obtainer 310, the pixel labeler 320, the pixel modifier 330, and the modified image synthesizer 340.

The operating system 530 includes procedures for handling various basic system services and for performing hardware dependent tasks.

As described herein, in various implementations, the data obtainer 310 obtains (e.g., receives or retrieves) image data frames (e.g., the image data frame 112 shown in FIGS. 1 and 3). To that end, the data obtainer 310 includes instructions 310a and heuristics and metadata 310b. As described herein, in various implementations, the pixel labeler 320 generates pixel characterization vectors for pixels in an image data frame (e.g., the pixel characterization vectors 322 shown in FIG. 3). To that end, the pixel labeler 320 includes instructions 320a and heuristics and metadata 320b. As described herein, in various implementations, the pixel modifier 330 modifies one or more of the pixels in the image data frame in order to obfuscate location data associated with a first location label (e.g., the pixel modifier 330 generates the modified pixel data 62 shown in FIGS. 1 and 3). To that end, the pixel modifier 330 includes instructions 330a and instructions and heuristics 330b. As described herein, in various implementations, the modified image synthesizer 340 synthesizes a modified image data frame that includes modified pixel data for pixels corresponding to the first location label and unmodified pixel data for pixels that do not correspond to the first location label (e.g., the modified image data frame 60 includes modified pixel data 62 for the first and third pixels, and unmodified pixel data 52b and 52d for the second and fourth pixels). To that end, the modified image synthesizer 340 includes instructions 340a and instructions and heuristics 340b.

Although the data obtainer 310, the pixel labeler 320, the pixel modifier 330, and the modified image synthesizer 340 are shown as residing on a single device (e.g., the filtering device 106), it should be understood that in other implementations, any combination of the data obtainer 310, the pixel labeler 320, the pixel modifier 330, and the modified image synthesizer 340 may be located in separate computing devices.

Moreover, FIG. 5 is intended more as functional description of the various features which be present in a particular implementation as opposed to a structural schematic of the implementations described herein. As recognized by those of ordinary skill in the art, items shown separately could be combined and some items could be separated. For example, some functional blocks shown separately in FIG. 5 could be implemented as a single block and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise.

It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including an environmental sensor, a non-transitory memory, and one or more processors coupled with the environmental sensor and the non-transitory memory:
        obtaining, via the environmental sensor, environmental data corresponding to a physical environment;
        identifying a first portion of the environmental data that indicates a location of the physical environment;
        in response to the location being a first location type, performing a first type of modification to the first portion of the environmental data; and
        in response to the location being a second location type that is different from the first location type, performing a second type of modification to the first portion of the environmental data.

2. The method of claim 1, wherein the environmental data comprises at least one of an image or a mesh map comprising depth sensor information.

3. The method of claim 1, further comprising generating a pixel characterization vector that includes a location label indicative of the first location type or the second location type.

4. A device comprising:
    one or more processors;
    a non-transitory memory;
    an environmental sensor; and
    one or more programs stored in the non-transitory memory, which, when executed by the one or more processors, cause the device to:
        obtain, via the environmental sensor, environmental data corresponding to a physical environment;
        identify a first portion of the environmental data that indicates a location of the physical environment;
        in response to the location being a first location type, perform a first type of modification to the first portion of the environmental data; and
        in response to the location being a second location type that is different from the first location type, perform a second type of modification to the first portion of the environmental data.

5. A non-transitory memory storing one or more programs, which, when executed by one or more processors of a device, cause the device to:
    obtain, via an environmental sensor, environmental data corresponding to a physical environment;
    identify a first portion of the environmental data that indicates a location of the physical environment;
    in response to the location being a first location type, perform a first type of modification to the first portion of the environmental data; and
    in response to the location being a second location type that is different from the first location type, perform a second type of modification to the first portion of the environmental data.

6. The method of claim 1, wherein performing the first type of modification comprises performing a blurring operation on the first portion of the environmental data; and
    wherein performing the second type of modification comprises setting the first portion of the environmental data to a particular color.

7. The method of claim 1, wherein performing the first type of modification comprises performing a blurring operation on the first portion of the environmental data; and
    wherein performing the second type of modification comprises replacing the first portion of the environmental data with replacement data indicative of a third location type.

8. The method of claim 1, wherein performing the first type of modification comprises overlaying a masking element on top of the first portion of the environmental data; and
    wherein performing the second type of modification comprises removing the first portion of the environmental data.

9. The method of claim 1, wherein performing the first type of modification comprises obfuscating the first portion of the environmental data to a first degree of obfuscation; and
    wherein performing the second type of modification comprises obfuscating the first portion of the environment to a second degree of obfuscation that is greater than the first degree of obfuscation.

10. The method of claim 1, wherein the first location type corresponds to a public location and the second location type corresponds to a private location.

11. The device of claim 4, wherein performing the first type of modification comprises performing a blurring operation on the first portion of the environmental data; and
    wherein performing the second type of modification comprises setting the first portion of the environmental data to a particular color.

12. The device of claim 4, wherein performing the first type of modification comprises performing a blurring operation on the first portion of the environmental data; and
    wherein performing the second type of modification comprises replacing the first portion of the environmental data with replacement data indicative of a third location type.

13. The device of claim 4, wherein performing the first type of modification comprises overlaying a masking element on top of the first portion of the environmental data; and
    wherein performing the second type of modification comprises removing the first portion of the environmental data.

14. The device of claim 4, wherein performing the first type of modification comprises obfuscating the first portion of the environmental data to a first degree of obfuscation; and wherein performing the second type of modification comprises obfuscating the first portion of the environment to a second degree of obfuscation that is greater than the first degree of obfuscation.

15. The device of claim 4, wherein the first location type corresponds to a public location and the second location type corresponds to a private location.

16. The non-transitory memory of claim 5, wherein performing the first type of modification comprises performing a blurring operation on the first portion of the environmental data; and wherein performing the second type of modification comprises setting the first portion of the environmental data to a particular color.

17. The non-transitory memory of claim 5, wherein performing the first type of modification comprises performing a blurring operation on the first portion of the environmental data; and wherein performing the second type of modification comprises replacing the first portion of the environmental data with replacement data indicative of a third location type.

18. The non-transitory memory of claim 5, wherein performing the first type of modification comprises overlaying a masking element on top of the first portion of the environmental data; and wherein performing the second type of modification comprises removing the first portion of the environmental data.

19. The non-transitory memory of claim 5, wherein performing the first type of modification comprises obfuscating the first portion of the environmental data to a first degree of obfuscation; and wherein performing the second type of modification comprises obfuscating the first portion of the environment to a second degree of obfuscation that is greater than the first degree of obfuscation.

20. The non-transitory memory of claim 5, wherein the first location type corresponds to a public location and the second location type corresponds to a private location.

* * * * *